(12) United States Patent
Shiota et al.

(10) Patent No.: US 12,190,596 B2
(45) Date of Patent: Jan. 7, 2025

(54) VEHICLE APPARATUS, VEHICLE PROGRAM AND RECODING MEDIA THEREOF

(71) Applicant: DENSO CORPORATION, Kariya (JP)

(72) Inventors: Kentarou Shiota, Kariya (JP); Naoki Nitanda, Kariya (JP); Kazuma Ishigaki, Kariya (JP); Shinya Taguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 410 days.

(21) Appl. No.: 17/507,688

(22) Filed: Oct. 21, 2021

(65) Prior Publication Data

US 2022/0044031 A1 Feb. 10, 2022

Related U.S. Application Data

(63) Continuation of application No. PCT/JP2020/015534, filed on Apr. 6, 2020.

(30) Foreign Application Priority Data

Apr. 23, 2019 (JP) .................................. 2019-081934

(51) Int. Cl.
*G06V 20/56* (2022.01)
*G06F 18/243* (2023.01)
(Continued)

(52) U.S. Cl.
CPC ............ *G06V 20/56* (2022.01); *G06F 18/243* (2023.01); *G06V 10/44* (2022.01); *G08G 1/13* (2013.01); *G08G 1/137* (2013.01)

(58) Field of Classification Search
CPC ...... G06V 20/56; G06V 10/44; G06F 18/243; G08G 1/13; G08G 1/137
See application file for complete search history.

(56) References Cited

U.S. PATENT DOCUMENTS 9,665,100 B2    5/2017   Shashua et al.
2010/0057356 A1*  3/2010   Lin .................... G01C 21/3848
                                           348/118

(Continued)

FOREIGN PATENT DOCUMENTS

JP      2007-183846 A    7/2007
JP      2010-170488 A    8/2010

*Primary Examiner* — David Perlman
(74) *Attorney, Agent, or Firm* — Maschoff Brennan

(57) ABSTRACT

The travelling route recognition unit recognizes, based on an image captured by an imaging apparatus capturing an area in the vicinity of the vehicle, a travelling route where the vehicle travels. The classifying unit classifies the travelling route into at least one of a predetermined plurality of road models. The edge point extracting unit extracts edge points necessary for expressing the road model classified by the classifying unit among edge points indicating a boundary of the travelling route recognized by the travelling route recognition unit. The parameter generation unit correlates road model information indicating the road model classified by the classifying unit with the edge points extracted by the edge point extracting unit and generates a travelling route parameter indicating the travelling route recognized by the travelling route recognition unit. The transmission unit transmits the travelling route parameter generated by the parameter generation unit to the server.

12 Claims, 5 Drawing Sheets

(51) Int. Cl.
    *G06V 10/44*     (2022.01)
    *G08G 1/13*     (2006.01)
    *G08G 1/137*     (2006.01)

(56) References Cited

U.S. PATENT DOCUMENTS

| | | | |
|---|---|---|---|
| 2012/0185167 A1* | 7/2012 | Higuchi | G06V 20/588 382/104 |
| 2013/0318347 A1* | 11/2013 | Moffat | H04L 9/0894 713/168 |
| 2015/0027624 A1 | 10/2015 | Singh | |
| 2015/0272624 A1 | 10/2015 | Singh | |
| 2017/0008562 A1 | 1/2017 | Shashua et al. | |
| 2017/0010617 A1 | 1/2017 | Shashua et al. | |
| 2018/0209801 A1* | 7/2018 | Stentz | G01C 21/3415 |
| 2019/0019330 A1* | 1/2019 | Miyaoka | G01C 21/3841 |
| 2019/0028721 A1* | 1/2019 | Rutschman | G02B 13/02 |
| 2019/0113925 A1 | 4/2019 | Sim | |
| 2020/0201315 A1* | 6/2020 | Gogna | G01C 21/3415 |
| 2020/0257301 A1* | 8/2020 | Weiser | G06V 20/56 |

\* cited by examiner

FIG.2
[STRAIGHT LINE]
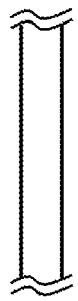
[CURVED LINE]
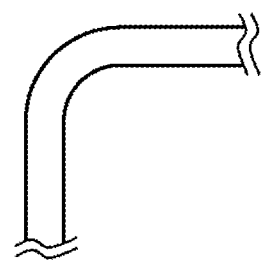
[CLOTHOID]
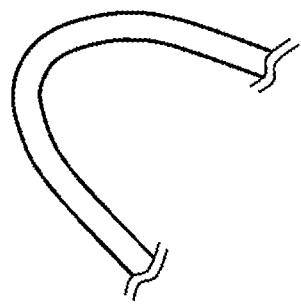
[INTEGRATION]
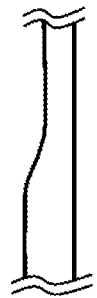

<FITTING EXAMPLE>

VEHICLE APPARATUS, VEHICLE PROGRAM AND RECODING MEDIA THEREOF

CROSS-REFERENCE TO RELATED APPLICATIONS

This application is the U.S. bypass application of International Application No. PCT/JP2020/15534 filed on Apr. 6, 2020, which designated the U.S. and claims priority to Japanese Patent Application No. 2019-081934 filed on Apr. 23, 2019, the contents of both of these are incorporated herein by reference.

BACKGROUND

Technical Field

The present disclosure relates to a vehicle apparatus communicating with a server provided outside the vehicle, a vehicle program and a recording media thereof.

Description of the Related Art

A technique is known for a system in which an image captured by a camera mounted on a vehicle is used to store positional information such as a landmark, generating a rough map by uploading the positional information to a server or the like, and when the vehicle is travelling, the generated rough map is downloaded to determine the location of the own vehicle. In the above-described system, when generating the map, communication is performed between the vehicle and the server in order to exchange various information therebetween. In such a circumstance, when considering user convenience, for the communication between the vehicle and the server, a communication quantity and a communication load may preferably be reduced as much as possible.

SUMMARY

According to one aspect of the present disclosure, a vehicle apparatus is configured to communicate with a server provided outside the vehicle, the vehicle apparatus being provided with a travelling route recognition unit, a classifying unit, an edge point extracting unit, a parameter generation unit and a transmission unit. The travelling route recognition unit recognizes a travelling route where the vehicle travels. The classifying unit classifies the travelling route into at least one of a predetermined plurality of road models. The edge point extracting unit extracts edge points necessary for expressing the road model classified by the classifying unit. The parameter generation unit correlates road model information indicating the road model with the edge points and generates a travelling route parameter indicating the travelling route. The transmission unit transmits the travelling route parameter to the server.

BRIEF DESCRIPTION OF THE DRAWINGS

The above objectives and other objectives, features and advantages of the present disclosure will be clarified further by the following detailed description with reference to the accompanying drawings. The drawings are:

FIG. 2 is a diagram schematically showing a specific example of road models according to the first embodiment.

DETAILED DESCRIPTION OF THE PREFERRED EMBODIMENTS

Japanese Translation of PCT application Publication No. 2018-510373 discloses a technique for a system in which an image captured by a camera mounted on a vehicle is used to store positional information such as a landmark, generating a rough map by uploading the positional information to a server or the like, and when the vehicle is travelling, the generated rough map is downloaded to determine the location of the own vehicle. According to the above-described system, when generating the map, communication is performed between the vehicle and the server in order to exchange various information therebetween. In such a circumstance, when considering user convenience, for the communication between the vehicle and the server, a communication quantity and a communication load may preferably be reduced as much as possible.

Hereinafter, with reference to the drawings, a plurality of embodiments will be described. For substantially identical configurations in the respective embodiments, the same reference symbols are applied and the explanation thereof will be omitted.

First Embodiment

Hereinafter, a first embodiment will be described with reference to FIGS. 1 to 5.

Figure 1:
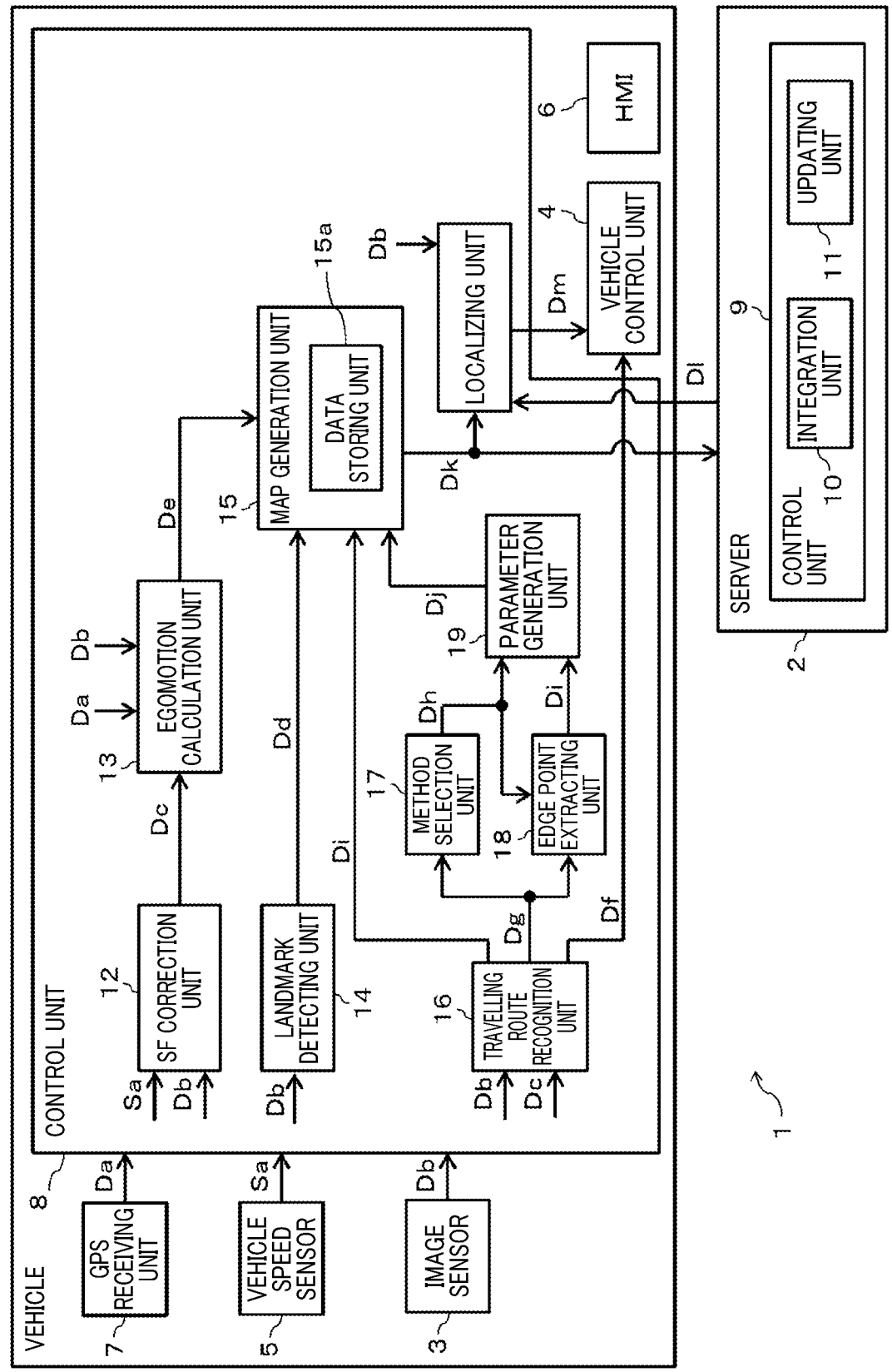
FIG. 1 is a block diagram schematically showing a map system according to a first embodiment.

A map system 1 shown in FIG. 1 is for a map system of an autonomous navigation. The map system 1 has a significant effect of identifying the location with higher accuracy in addition to a conventional function such as GPS for identifying the location of the own vehicle. The map system 1 is provided with two separate functions, that is, utilization of maps and map updating.

For map utilization, the map information stored in the server 2 is downloaded to the vehicle, and the vehicle identifies the location of the own vehicle based on the downloaded map information and the location of a landmark such as a road sign included in an image captured by an image sensor 3 such as a camera. In this specification, the map information stored in the server 2 is sometimes referred to as an integrated map. In this case, a vehicle control unit 4 outputs an instruction to an actuator for operating hardware mounted on the vehicle, whereby driving support is accomplished. The actuator is a hardware-type device for controlling the vehicle, for example, a brake, a throttle, a steering and a lamp On the other hand, in the map update, information as probe data acquired by various sensors such as an image sensor 3, the vehicle speed sensor 5 and an unshown millimeter wave sensor is updated to the server 2, and the integrated map in the server 2 is successively updated. Thus, in the vehicle, driving support and automatic steering operation are accomplished while constantly identifying the location of the vehicle accurately using the latest map information.

In the map system 1, a human machine interface 6 serves as a user interface for notifying various information to the user and applying a predetermined operation by the user to the vehicle. In the specification, the human machine interface is sometimes abbreviated as HMI. The HMI 6 includes a display device included in the car-navigation apparatus, a display integrated in an instrument panel, a head-up display projected on the windshield, a microphone and speakers. Further, a mobile terminal such as a smartphone communicably connected to the vehicle may be the HMI 6 in the map system 1.

The user can visually obtain information displayed on the HMI 6 and also obtain information by sound, alert sounds and vibration. The user can specify a desired operation of the vehicle by a touch operation on the display or a voice input operation. For example, in the case where the user receives high level driving support such as automatic steering operation using the map information, the user enables the corresponding function via the HMI 6. For example, a map-cooperation button displayed on the display is pressed, thereby enabling the function of utilizing the map and starting the download of the map information.

As another example, with an instruction by voice input, the function of the map utilization is enabled. The uploading process of the map information for updating the map may be always executed while the communication between the vehicle and the server 2 is established, or may be executed while the function of utilizing the map is enabled by pressing the map-cooperation button. Alternatively, the uploading process of the map information for updating the map may be enabled by another user interface UI where the user's intention is reflected.

The map system 1 according to the present embodiment is provided with the server 2 and respective configurations in the vehicle side. The respective configurations in the vehicle side includes the image sensor 3, the vehicle control unit 4, the vehicle speed sensor 5, the HMI 6, a GPS receiving unit 7 and the control unit 8. The server 2 is disposed in a portion separate from the vehicle in which the image sensor 3 and the like are mounted. The server 2 is provided with a control unit 9. The control unit 9 is mainly configured of a microcomputer having CPU, ROM, RAM, I/O and the like, and includes an integration unit 10 and an updating unit 11.

These functional blocks are accomplished by executing a computer program stored in a non-transitory tangible recording media with the CPU of the control unit 9 to execute a process corresponding to the computer program. In other words, these function blocks are accomplished by software. The integration unit 10 and the updating unit 11 are for executing various processes related to the above-described map update, and the detailed configuration thereof will be described later.

The GPS receiving unit 7 outputs GPS information data Da indicated by a signal received via the GPS antenna which is not shown to the control unit 8 or the like. The vehicle speed sensor 5 detects a vehicle speed as a travelling speed of the vehicle. The vehicle speed sensor 5 is configured as a wheel speed sensor that detects a wheel speed of the vehicle. The vehicle speed sensor 5 outputs a signal Sa indicating the detection speed as the detection value to the control unit 8 or the like.

The image sensor 3 is mounted on the vehicle, serving as an imaging apparatus that captures an environment in the vicinity of the vehicle, that is, an environmental image in a predetermined range of an area in front of the vehicle with respect to the vehicle travelling direction. The image sensor 3 is not limited to a configuration that captures an area in front of the vehicle with respect the travelling direction of the vehicle. For example, the image sensor may be configured to capture a back area or a lateral area. The environmental information captured by the image sensor 3 is stored into a memory device (not shown) in a form of still images or moving images (hereinafter these images are referred to as images). The control unit 8 is configured to be capable of reading the data Db stored in the memory device and executes various processes based on the data Db.

The control unit 8 is mainly configured of a microcomputer having CPU, ROM, RAM, I/O and the like. The control unit 8 is provided with functional blocks such as a scale factor correction unit 12, an egomotion calculation unit 13, a landmark detecting unit 14, a map generation unit 15, a travelling route recognition unit 16, a method selection unit 17, an edge point extracting unit 18, a parameter generation unit 19, and a localizing unit 20. These functional blocks are accomplished by the CPU of the control unit 8 executing a computer program stored in a non-transitory tangible recording media to execute a process corresponding to the computer program. In other words, these function blocks are accomplished by software.

The control unit 8 constitutes an electronic control apparatus mounted on a vehicle, that is, a part of an on-vehicle apparatus such as ECU and functions as an apparatus for a vehicle communicating with a server 2 provided outside the vehicle. Hence, a computer program executed by the microcomputer of the control unit 8 includes a vehicle program for communicating with the server 2 provided outside the vehicle.

The scale factor correction unit 12 is configured to learn a scale factor of the vehicle speed sensor 5 based on the signal Sa transmitted from the vehicle speed sensor 5 and the data Db indicating an image captured by the image sensor 3. According to the specification of the present disclosure, the scale factor correction unit is sometimes abbreviated SF correction unit. The scale factor of the vehicle speed sensor 5 refers to a ratio of the detection value of the vehicle speed sensor 5 to the vehicle speed as a measurement object of the vehicle speed sensor 5, that is, the ratio of an input change of the vehicle speed sensor 5 to an output change of the vehicle speed sensor 5 and is a coefficient for obtaining a true value of the vehicle speed from the detection value of the vehicle speed sensor 5. The SF correction unit 12 detects the vehicle speed of the own vehicle based on the scale factor which is corrected with the signal Sa transmitted from the vehicle speed sensor 5 and the learning, and outputs the data Dc indicating the detection value to the egomotion calculation unit 13.

The landmark detecting unit 14 detects a landmark based on the data Db and outputs data Dd indicating positional information related to the position of the detected landmark to the map generation unit 15. For the detection method of the position of the landmark, various methods can be applied. The above-described landmark includes road signs, signboards, poles such as utility poles and streetlights, a white lines and signals.

The egomotion calculation unit 13 calculates, based on the data Db, an egomotion as a parameter indicating a behavior of the own vehicle, that is, a posture of the vehicle. In this case, for the calculation of the egomotion, a method of structure from motion is utilized. According to the specification of the present disclosure, Structure From Motion is sometimes abbreviated as SFM. The egomotion calculation unit 13 is configured to be capable of performing a correction based on the data Da indicating the GPS information, that is, a GPS correction.

The egomotion calculation unit 13 is capable of recognizing an amount of movement of the own vehicle. However, the accuracy of the scale has a problem. In this respect, the egomotion calculation unit 13 acquires a moving speed of the own vehicle based on the data Dc indicating the detection value of the vehicle speed, and improves the above-mentioned accuracy of the scale based on the acquired moving speed. The egomotion calculation unit 13 outputs the data De indicating the calculated egomotion to a map generation unit 15.

The travelling route recognition unit 16 recognizes, based on the data Db and Dc, a travelling route where the own vehicle travels and acquires a road parameter. Each process executed by the travelling route recognition unit 16 corresponds to travelling route recognition process. The road parameter includes information indicating a lane width which is a width of the traffic lane and a shape of the traffic lane such as curvature of the traffic lane, that is, the road. Also, the road parameter includes an offset indicating a distance between the center position in the width direction of the traffic lane and the position of the own vehicle, and information indicating a travelling state of the own vehicle such as a yaw angle indicating an angle formed between the normal direction of the traffic lane, that is, the road and the traveling direction of the own vehicle.

The travelling route recognition unit 16 outputs the data Df indicating a road parameter to the vehicle control unit 4. Further, the travelling route recognition unit 16 outputs the data Dg indicating the recognizes travelling route to the method selection unit 17 and the edge point extracting unit 18. The method selection unit 17 determines, based on the data Dg, which one of a plurality of predetermined road models is fitted with the travelling route recognized by the travelling route recognition unit 16, and selects the fitting method.

In other words, the method section unit 17 classifies the travelling route recognized by the travelling route recognition unit 16 into at least one of the predetermined road models and has a function of a classifying unit. Note that respective processes executed by the method selection unit 17 correspond to classifying processes. For example, as shown in FIG. 2, the above-described road model includes a straight line road model, a curved line road model, a clothoid road model, and an integrated road model.

Among these road models, the clothoid road model is a model in which a relaxation curve is present before and after the curve. Also, the integrated road model is a model in which at least two above-described respective road models are integrated, for example, as shown in FIG. 2, the lane width is reduced, a left lane is changed to a clothoid from a straight line and then the road is changed again to the straight line.

Figure 3:
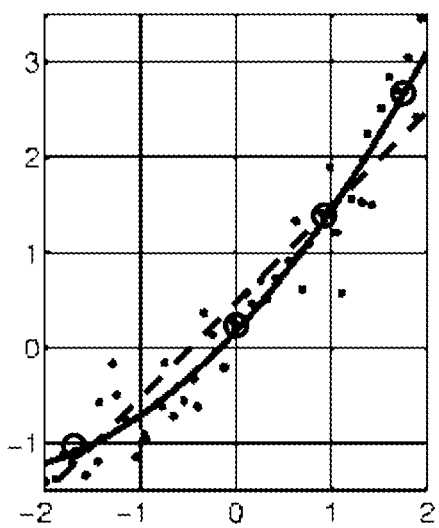
FIG. 3 is a graph schematically showing a specific example of fitting according to the first embodiment.

For the above-described fitting method, methods corresponding to respective road models are present. The method selection unit 17 executes a plurality of approximation processes as shown in FIG. 3, and selects a method having the smallest fitting error in the respective methods. In FIG. 3, a clothoid approximation is shown as an example with a solid line, and a straight line approximation is shown as an example with a dotted line. The method selection unit 17 outputs the method selected in this manner, that is, the data Dh indicating the classified road model, to the edge point extracting unit 18 and the parameter generation unit 19.

The edge point extracting unit 18 extracts, based on the data Dg and Dh, edge points necessary for expressing the road model classified by the method selection unit 17 among edge points indicating a boundary of the travelling route recognized by the travelling route recognition unit 16. The above-described edge points are for expressing the boundary such as a white line and a roadside. Note that respective processes executed by the edge point extracting unit 18 correspond to an edge point extracting process.

Specifically, the edge point extracting unit 18 is configured to select a plurality of points having the smallest fitting error from the approximation curve shown in FIG. 3 and extract them. When combining data on the server 2 side, and considering that no filtering is applied when integrating, a plurality of road data can be combined. Thus, misfitting can be suppressed. The edge point extracting unit 18 outputs the data Di indicating extracted edge points to the parameter generation unit 19.

The parameter generation unit 19 correlates, based on the data Dh and the data Di, the road model information indicating the road model classified by the method selection unit with the edge points extracted by the edge point extracting unit 18 and generates a travelling route parameter indicating the travelling route recognized by the travelling route recognition unit 16. Note that respective processes executed by the parameter generation unit 19 correspond to parameter generation process.

The parameter generation unit 19 outputs the data Dj indicating the generated travelling route parameter to the map generation unit 15. The map generation unit 15 generates map information based on the data Dd transmitted from the landmark detecting unit 14, the data De transmitted from the egomotion calculation unit 13 and the data Dj transmitted from the parameter generation unit 19. According to the present specification, the map information generated by the map generation unit 15 is sometimes referred to as a probe map.

The data Dk indicating the probe data generated by the map generation unit 15 is uploaded to the server 2 as the probe data and outputted to the localizing unit 20. Hence, according to the present embodiment, the map generation unit 15 has a function as a transmission unit that transmits the travelling route parameter to the server 2. Note that respective processes executed by the map generation unit 15 for such a transmission process correspond to a transmission process. For the probe map, since the accuracy of SFM is limited, the accuracy thereof is considered to be insufficient.

In this respect, the integration unit 10 of the server 2 produces a plurality of probe maps overlapped to be integrated in accordance with the data Dj transmitted from on-vehicle equipment of the respective vehicles, thereby improving the accuracy of the map. The updating unit 11 of the server 2 updates the integrated map when the integration unit 10 successfully performs the integration. In this case, in the above-described integration, the integration unit 10 restores the edge points based on the travelling route parameter, that is, the travelling route parameter is resumed to the edge points and various processes related to the integration using these edge points. Note that the integration unit 10 may execute the various processes related to the integration using the travelling route parameter itself.

The server 2 is configured to distribute the data Dl indicating the integrated map to on-vehicle equipment of respective vehicles. Note that respective processes related to the distribution executed by the server 2 correspond to a distribution process. In this case, the server 2 identifies an approximate location of the vehicle to which the data DI is distributed based on the GPS information or the like, and distributes an integrated map in the vicinity of the approximate location, for example, in a range having a radius of several kilometer with respect to the approximate location as the center thereof. In other words, the sever 2 is configured to generate map information in the vicinity of the vehicle based on the probe map including the travelling route parameter transmitted from a plurality of vehicles. In the case where a map is present on the vehicle side, that is, on-vehicle equipment side, the server 2 may distribute only differences from the map in the on-vehicle equipment.

The localizing unit 20 executes a localize process that estimates the current location of the own vehicle. The localizing unit 20 downloads the data DI indicating the integrated map from the server 2, and performs a localize process based on the downloaded data DI, the data Dk indicating the probe map and the data Db indicating an image captured by the image sensor 3. Note that the localizing unit 20 may perform a localize process without using the data Dk indicating the probe map.

The localizing unit 20 calculates a road parameter based on the road information when the localize process is succeeded. The localizing unit 20 outputs the data Dm indicating the road parameter based on the map information to the vehicle control unit 4. The vehicle control unit 4 executes various processes in order to control the travelling of the own vehicle based on the data Df transmitted from the travelling route recognition unit 16 and the data Dm transmitted from the localizing unit 20. Specifically, the vehicle control unit 4 executes various processes in order to control the travelling of the own vehicle.

The control unit 8 is provided with a non-volatile memory 21 and volatile memory and the like in addition to the above-described functional blocks. The non-volatile memory 21 is, for example, a flash ROM or the like and the memory capacity thereof is relatively small, and it stores only a part of the data DI indicating the integrated map. The volatile memory 22 is, for example, RAM or the like and the memory capacity thereof is relatively large which ensures the whole data DI indicating the integrated map can be stored. The non-volatile memory 21 stores in advance specific map information corresponding to specific locations.

For the specific locations, the following locations (a) to (d) are assumed.
 (a) locations where an ignition switch of the vehicle is frequently ON-OFF switched.
 (b) locations where the information quantity of map information is large.
 (c) locations where the communication environment is not suitable
 (d) locations where the vehicle frequently passes through A specific example of the above-described (a) includes, for example, a home and a location in the vicinity of workplace. A specific example of the above-described (b) includes, for example, a location in the vicinity of a junction of a highway, a location where the number of lanes is significantly large and a location where a road shape is complex. A specific example of the above-described (c) includes, for example, a rural area, a building and a parking lot. A specific example of the above-described (d) includes, for example, a commuting route and the like. In the case where updating is required, the specific map information stored in the non-volatile memory 21 can be updated using differences, during updating. Further, these specific locations and the specific map information can be stored in advance based on the collected information by test running or the like, and the probe data accumulated by on-vehicle equipment in the respective vehicles at a time of the test running.

As described above, the localizing unit 20 is configured to download the data DI indicating the integrated map from the server 2, at this time, only the information except the above-described specific map information is received. That is, the localizing unit 20 has a function of a receiving unit that receives information except for the specific map information among the map information distributed by the sever 2. The respective processes executed by the localizing unit 20 for the receiving function correspond to a receiving process. The localizing unit 20 stores the received map information into the volatile memory 22.

Figure 4:
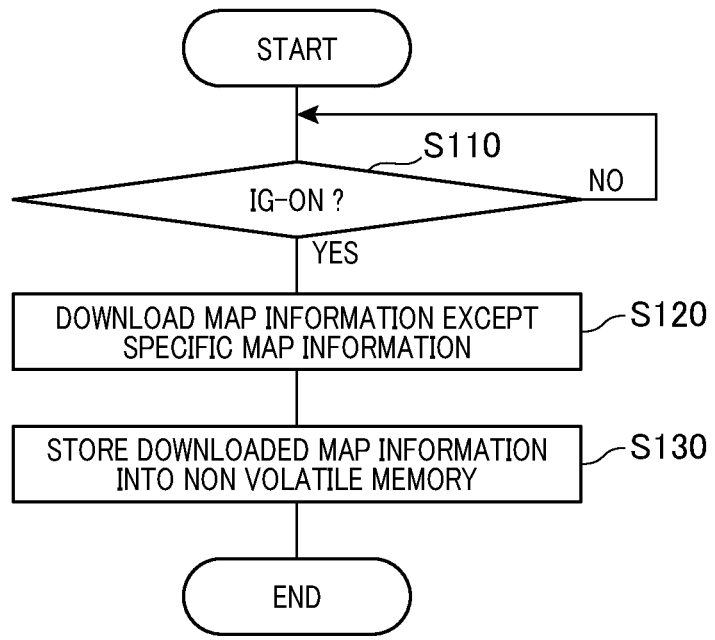
FIG. 4 is a flowchart schematically showing a content of a process for downloading map information according to the first embodiment.

The localizing unit 20 receives the above-described map information every time when the ignition switch of the vehicle is turned ON, that is, at each IG-ON state. This down loading process of the map information is shown in FIG. 4. That is, at step S110, the process determines whether it the state is IG-ON. When the IG-ON state is determined, the determination at step S110 is YES and control proceeds to step S120.

At step S120, the map information except the specific map information among the map information distributed from the server 2 is downloaded. After executing step S120, the process proceeds to step S130 at which the map information downloaded at step S120 is stored in the volatile memory 22. When executing the localizing process, the localizing unit 20 reads the specific map information stored in the non-volatile memory 21 and the map information stored in the volatile memory 22 to utilize them.

As described, the map generation unit 15 is configured to upload the data Dk indicating the probe map including the travelling route parameter to the server 2. The map generation unit 15 is provided with a data storing unit 15*a* which stores the data Dj indicating the travelling route parameter. As the data storing unit 15*a*, for example, a cache memory which is a high-speed low-capacity memory can be utilized. The map generation unit 15 temporarily stores the received data Dj in the data storing unit 15*a* and deletes the stored data Dj when completing the uploading of the data Dj to the server 2.

In this case, the upload timing of the data Dk by the map generation unit 15, that is, data transmission timing, is a time when determined that the data Dj indicating the travelling route parameter reaches a predetermined data quantity. In other words, the map generation unit 15 executes an uploading process of the data Dk indicating the probe map every time when a certain amount of data Dj indicating the travelling route parameter is accumulated.

Figure 5:
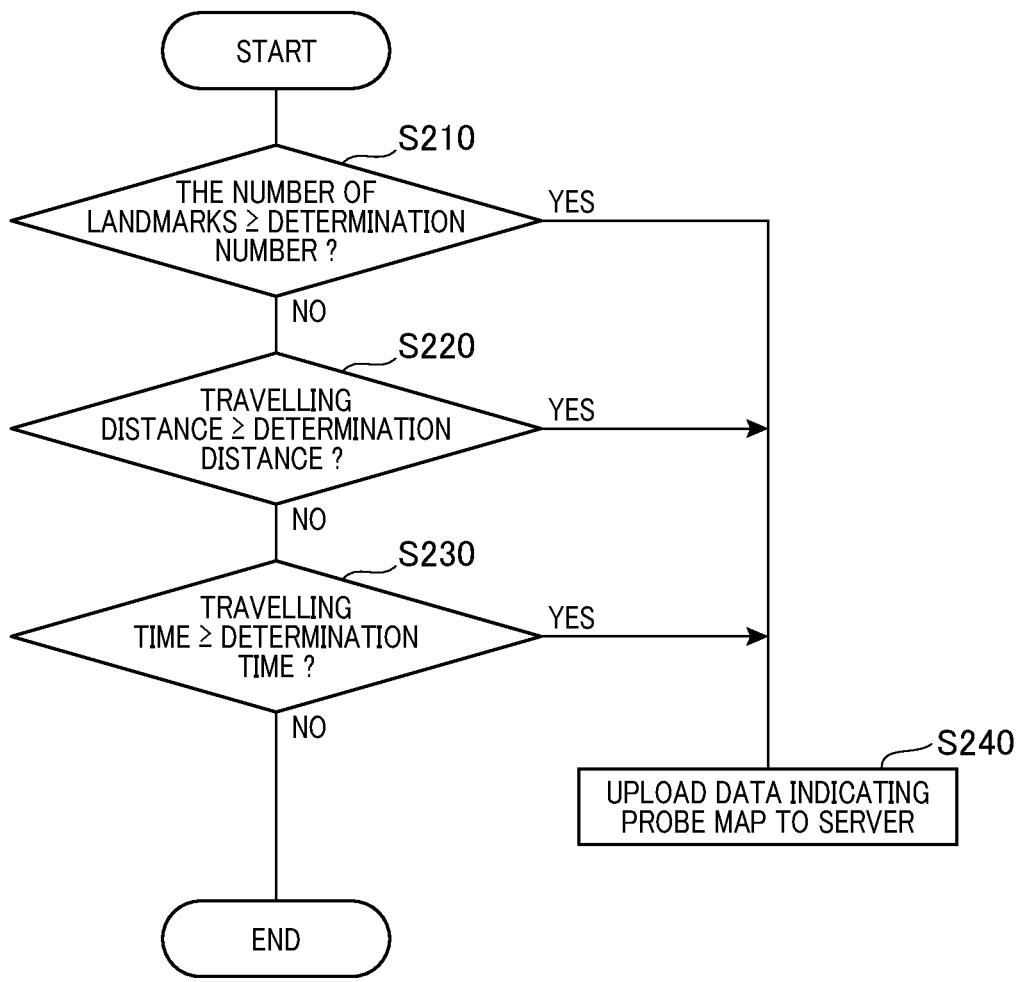
FIG. 5 is a flowchart schematically showing a content of a process for uploading map information according to the first embodiment.

The specific process flow of such an upload is shown in FIG. 5. That is, as shown in FIG. 5, at step S210, the process determines whether the number of landmarks, which the vehicle passed through after the previous upload was completed, has reached a predetermined determination number. When the number of landmarks does not reach the determination number, determination at step S210 is NO and the process proceeds to step S220.

At step S220, the process determines whether the travelling distance of the vehicle after a time when the previous uploading was completed has reached a predetermined determination distance. When the travelling distance has not reached the determination distance, the determination at step S220 is NO and the process proceeds to step S230. At step S230, the process determines whether the travelling time of the vehicle after a time when the previous uploading is completed has reached a predetermined determination time. When the travelling time has not reached the determination distance, the determination at step S220 is NO and the process is terminated.

Thus, in the case where the determinations at steps S210, S220 and S230 are all NO, that is, the number of landmarks has not reached the determination number, the travelling distance has not reached the determination distance, and the travelling time has not reached the determination time, the data Dk is not uploaded. On the other hand, when the number of landmarks has reached the determination number, the determination at step S210 is YES and control proceeds to step S240. When the travelling distance has reached the determination distance, the determination at step S220 is YES and control proceeds to step S240.

When the travelling time has reached the determination time, the determination at step S230 is YES and the process proceeds to step S240. At step S240, the data Dk indicating the probe map is uploaded to the server 2. Thus, in the case where the determination at any one of steps S210, S220 and S230 is YES, that is, when the number of landmarks has reached the determination number, or when the travelling distance has reached the determination distance, or when the travelling time has reached the determination time, the data Dk is uploaded.

Specifically, the map generation unit 15 determines at least one of a time when the number of landmarks where the vehicle passes has reached the determination number, a time when the travelling distance of the vehicle has reached the determination distance, and a time when the travelling time of the vehicle has reached the determination time to be the transmission timing. Note that the determination number, the determination distance and the determination time may be appropriately set depending on how much data Dj is accumulated to allow the data Dk to be uploaded, that is, depending on the above-described data quantity.

As described above, the control unit 8 according to the present embodiment is provided with the travelling route recognition unit 16 that recognizes the travelling route where the vehicle travels, the method selection unit 17, the edge point extracting unit 18, the parameter generation unit 19, and the map generation unit 15. The travelling route recognition unit 16 recognizes the travelling route of the vehicle based on the image sensor 3. The method selection unit 17 functions as a classifying unit that classifies the travelling route recognized by the travelling route recognition unit 16 into at least one of the predetermined road models.

The edge point extracting unit 18 extracts, based on the data Dg and Dh, edge points necessary for expressing the road model classified by the classifying unit among edge points indicating a boundary of the travelling route recognized by the travelling route recognition unit 16. The parameter generation unit 19 correlates the road model information indicating the road model classified by the classifying unit with the edge points extracted by the edge point extracting unit 18 and generates a travelling route parameter indicating the travelling route recognized by the travelling route recognition unit 16. The map generation unit 15 functions as a transmission unit that transmits the travelling route parameter generated by the parameter generation unit 19 to the server 2.

According to such a configuration, depending on the road models such as a straight line, a curved line and a clothoid line, the data Dk including the data Dj expressing the road parameter including edge points required for expressing these road models, that is, minimum edge points required for a fitting, is transmitted to the server 2. In this case, the data Dk, including the data Dj indicating the travelling route parameter in which unnecessary edge points for expressing the classified road model are removed, is transmitted to the server 2. Thus, according to the above-described configuration, for example, compared to a case where all edge points indicating the boundary of the travelling route are transmitted to the server 2, the communication quantity when uploading the data to the server 2 from the vehicle can be significantly reduced.

It is considered that the data can be transmitted to the server after applying the fitting with a third order function or the like in order to cover all of the plurality of expected road models. However, in this case, it is wasteful when an object travelling route is a straight road. According to the above-described configuration, since the travelling route recognized by the travelling route reignition unit 16 is classified into at least one of the road models, and the data is transmitted to the server 2 with only the necessary edge points required for expressing the corresponding road model, the communication quantity for uploading the data to the server 2 from the vehicle can be lowered. Therefore, according to the present embodiment, significant effects can be obtained in which the communication quantity is reduced in communication between the vehicle and the server 2.

For the control unit 8 configured as described above, in view of cost reduction, a non-volatile memory device having a large capacity such as HDD, SDD or the like as a memory apparatus for storing the map information distributed from the server 2 is not mounted thereto, but a volatile memory 22 as a volatile memory apparatus is mounted thereto. Hence, according to the above-described configuration, the localizing unit 20 of the control unit 8 is required to download the map information from the server 2 every time when the ignition switch is turned ON.

Therefore, according to the above-described configuration, there is a concern that the map system 1 cannot be operated until the downloading of the map information is completed in a location where the ignition switch of the vehicle is frequently switched ON and OFF. According to the above-described configuration, a longer time is required for completing the downloading of the map information in a location where the information quantity of the map information is large and a location where the communication environment is not suitable. As a result, a period where the map system 1 cannot be operated and the number of sections where the map system 1 cannot be operated may be increased.

For this reason, according to the present embodiment, a non-volatile memory 21 having a small capacity is provided in which the specific map information as the map information of the above-described respective locations is stored in advance into the non-volatile memory 21, and the localizing unit 20 is configured to receive only the information except for the specific map information when downloading the map information from the server 2. Thus, this configuration is able to reduce a period and number of sections where the map system 1 cannot be operated, and lower the communication quantity when the vehicle downloads the data from the server 2.

Also, in this case, the non-volatile memory 21 stores in advance the specific map information as the map information for a location where vehicles frequently pass through. According to this configuration, since the map information for a location where vehicles frequently pass through is not downloaded every time when the ignition switch is turned ON, with this communication quantity reduced by not downloading the data, the communication quantity when the vehicle downloads the data from the server 2 can be lowered.

The map generation unit 15 is configured to transmit, at a transmission timing at which the data Dj indicating the travelling route parameter is determined to reach a predetermined data quantity, the data Dk indicating the probe map including the data Dj. With this configuration, compared to a case where the data Dk is transmitted every time when the parameter generation unit 19 generates the data Dj indicating the travelling route parameter, the frequency for transmitting the data Dk can be lowered and thus the communication load when uploading the data can be lowered.

The map generation unit 15 is configured to determine at least one of a time when the number of landmarks where the vehicle passes has reached the determination number, a time when the travelling distance of the vehicle has reached the determination distance, and a time when the travelling time of the vehicle has reached the determination time to be the above-described transmission timing. Thus, the transmission timing at which the data Dk is uploaded can be appropriately set to be a desired timing.

Second Embodiment

Hereinafter, with reference to FIG. 6, a second embodiment will be described. According to the present embodiment, a function as a transmission unit included in the map generation unit 15 is changed from the first embodiment. The map generation unit 15 cannot upload the data in a location where the vehicle is unable to communicate with the server 2. Hence, in such a location where the vehicle is unable to communicate with the server 2, for example, in a tunnel, the data cannot be uploaded. Hence, data quantity stored in the data storing unit 15a continues to increase in such a location.

In the case where the data quantity of the data Dj received by the map generation unit 15 exceeds the maximum storage capacity of the data storing unit 15a, the data Dj is no longer stored. Hence, data should be removed before the data quantity exceeds the maximum storage capacity based on any condition. In this respect, according to the present embodiment, the map generation unit 15 is configured to apply priorities to the respective stored data when the data stored in the data storing unit 15a reaches a predetermined allowable data quantity, and executes a selection process of data based on the priorities. In this case, the allowable data quantity is set to be a predetermined value which is less than the maximum storage capacity of the data storing unit 15a. These processes are shown in FIG. 6, for example.

Figure 6:
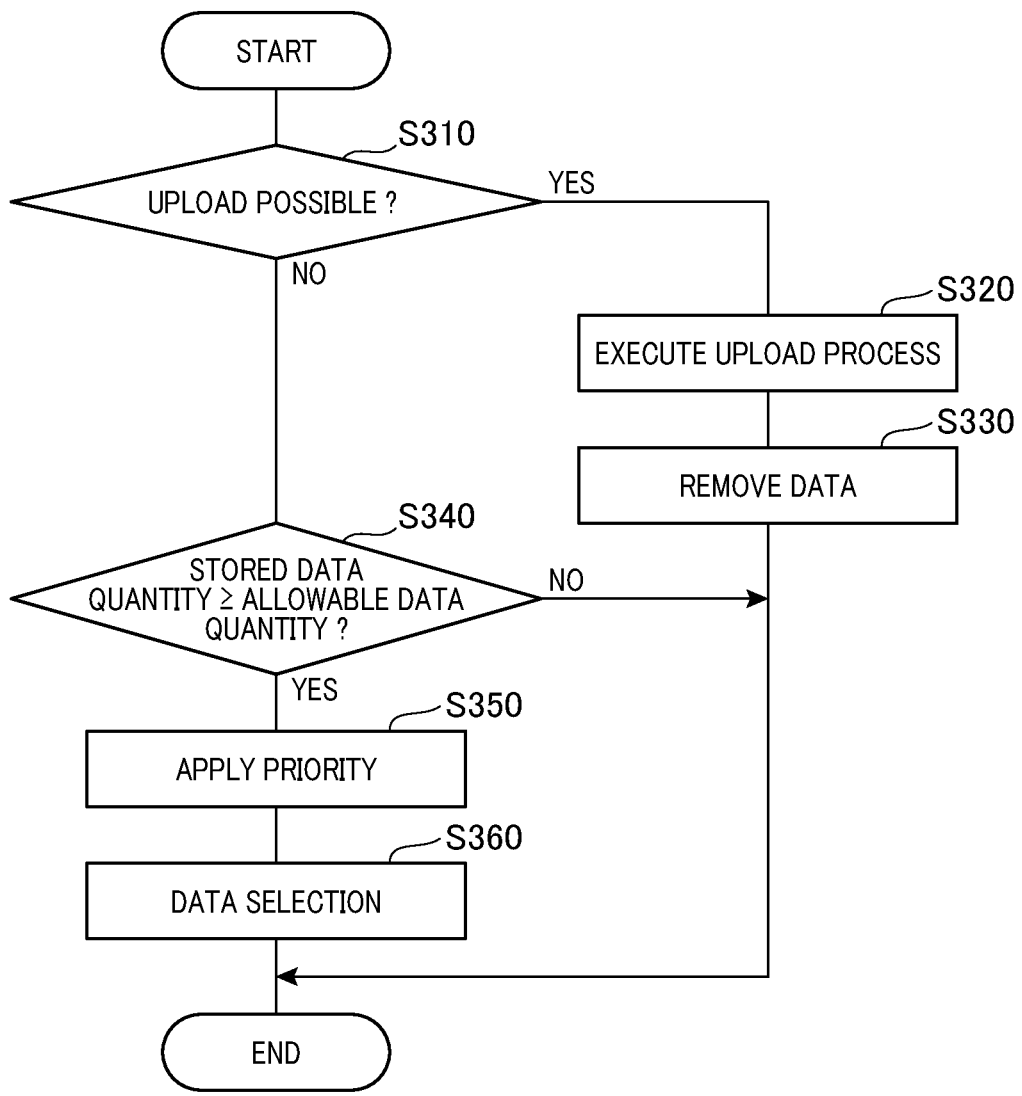
FIG. 6 is a flowchart schematically showing a content of a process executed by a map generation unit according to a second embodiment.

As shown in FIG. 6, at step S310, the process determines whether the data Dk can be uploaded. Here, when determined that the data Dk can be uploaded, the determination at step S210 is YES and the process proceeds to step S320. At step S320, an uploading process is executed such that the data Dk is transmitted to the server 2. After executing the process at step S320, the process proceeds to step S330 and the data Dj is removed. After completing the step S330, the present process is terminated.

On the other hand, when determined that it is impossible to upload the data Dk, the determination at step S310 is NO and the process proceeds to step S340. At step S340, the process determines whether a stored data quantity as data stored in the data storing unit 15a reaches the allowable data quantity. When determined that the stored data quantity does not reach the allowable data quantity, the determination at step S340 is NO and the process is terminated.

On the other hand, when the stored data quantity reaches the allowable data quantity, the determination at step S340 is YES and the process proceeds to step S350. At step S350, priorities are applied to respective data stored in the data storing unit 15a. After executing the step S350, the process proceeds to step S360 and selects respective data stored in the data storing unit 15a based on the applied priorities. After executing step S360, the process is terminated.

As a specific method for applying priorities by the map generation unit 15, in the following three methods, a least one or a combination of at least two methods can be employed.

[1] First Method

According to a first method, priorities are applied to respective data stored in the data storing unit 15a such that the older the last-updated date of data, the higher the priority is.

When the respective data is selected based on the applied priorities by the first method, data is removed sequentially from the newest data having the latest updated date to older data, and data having older last-updated date is preferentially remained. Thus, the storage capacity of the data storing unit 15a can be appropriately secured while making data having an older last-updated date and higher importance possible to be uploaded to the server 2.

[2] Second Method

According to a second method, the map generation unit 15 applies priorities to the respective data stored in the data storing unit 15a based on an instruction from the server 2. As a specific content of the instruction from the server 2, the following example is present. The server 2 instructs the map generation unit 15 of a predetermined vehicle to set priorities of the respective data such that data for a part of a tunnel (e.g. a section from a tunnel entrance to an intermediate part thereof) remains and data for another part of the tunnel (e.g. a section from the intermediate part to a tunnel exit) is removed.

Then, the server 2 instructs the map generation unit 15 of another vehicle other than the predetermined vehicle to set the priorities such that data for a part of a tunnel is removed and data for other part of the tunnel remains. Thus, the server 2 is able to acquire the data for the whole tunnel and the map generation units 15 of the respective vehicles are able to appropriately secure the storage capacity of the data storing unit 15.

As a specific content of the instruction from the server 2, the following example is given.

The server 2 instructs the map generation units 15 of the respective vehicles such that priorities of data for a portion in which no information is present in the integrated map generated by the server 2, among the respective data stored in the data storing unit 15a, is higher than data for a portion in which information is present in the integrated map. Thus, the server 2 can acquire data preferentially which is not present in the integrated map generated at the moment, and further the storing capacities of these data storing unit 15a can be appropriately secured.

[3] Third Method

According to a third method, the map generation unit 15 applies, based on the own determination, priorities to the respective data stored in the data storing unit 15a. For example, the map generation unit 15 sets priorities of the respective data such that priorities of data for a portion in which no information is present in the probe map generated by itself, among the respective data stored in the data storing unit 15a, is higher than data for a portion in which information is present in the probe map. Thus, the map generation unit 15 is able to preferentially reserve the data which is not present in the probe map generated at the moment and able to use the data for generating a new probe map, and further the storing capacities of these data storing unit 15a can be appropriately secured.

As described above, according to the present embodiment, the following effects and advantages can be obtained. The map generation unit 15 is configured to apply priorities to the stored respective data when the data stored in the data storing unit 15a reaches the allowable data quantity, and execute the selection process based on the priorities. Thus, even in the case where the vehicle cannot communicate with the server 2 for a long period, for example, when the vehicle passes through a relatively long tunnel having a length of a few kilometers, the quantity of data stored in the data storing unit 15a can be prevented from exceeding the maximum storage capacity.

In this case, priorities are applied to the respective data and the respective data stored in the data storing unit 15a is selected such that data is sequentially removed from the lowest priority. As a result, when generating the map in the vehicle side or the server 2 side, highly required data preferentially remains, the data is sequentially removed starting with data having relatively low necessity. Hence, according to the present embodiment, storage capacity of the data storing unit 15a which is a limited source can be utilized as much as possible, and the accuracy for generating and updating the map in the map system 1 can be appropriately maintained without being influenced by the state of the communication environment between the vehicle and the server 2.

Other Embodiments

The present disclosure is not limited to the above-described respective embodiments shown in the drawings, and can be arbitrarily modified and combined or expanded without departing from the scope of the present disclosure. Moreover, numeric values described in the above-described respective embodiments are exemplifications and are not limited thereto.

In the map system 1, respective functional blocks may be distributed. For example, a part of the respective functional blocks provided in the control unit 8 in the vehicle side, that is, on-vehicle equipment side may be provided in the control unit 9 in the server side, and respective control units transmit and receive various data via communication, whereby respective processes as described in the above-described embodiments are executed.

The map generation unit 5 may always execute the processes at steps S340, S350 and S360 shown in FIG. 6. In other words, the map generation unit 15 may always execute the selection process for the respective data such that the storing quantity of the data stored in the data storing unit 15a do not exceed the allowable data quantity in addition to a case where the data is unable to be updated because of bad communication environment.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

The control unit and method thereof disclosed in the present disclosure may be accomplished by a dedicated computer constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computers where a processor and a memory programmed to execute one or more functions, and a processor configured of one or more hardware logic circuits, are combined. Furthermore, the computer programs may be stored, as instruction codes executed by the computer, into a computer readable non-transitory tangible recording media.

CONCLUSION

The present disclosure provides a vehicle apparatus, a vehicle program and a recording media capable of reducing a communication quantity of communication between the vehicle and the server.

According to one aspect of the present disclosure, a vehicle apparatus is configured to communicate with a server provided outside the vehicle, the vehicle apparatus being provided with a travelling route recognition unit, a classifying unit, an edge point extracting unit, a parameter generation unit and a transmission unit. The travelling route recognition unit recognizes, based on an image captured by an imaging apparatus capturing an area in the vicinity of the vehicle, a travelling route where the vehicle travels. The classifying unit classifies the travelling route recognized by the travelling route recognition unit into at least one of a predetermined plurality of road models.

The edge point extracting unit extracts edge points necessary for expressing the road model classified by the classifying unit among edge points indicating a boundary of the travelling route recognized by the travelling route recognition unit. The parameter generation unit correlates road model information indicating the road model classified by the classifying unit with the edge points extracted by the edge point extracting unit and generates a travelling route parameter indicating the travelling route recognized by the travelling route recognition unit. The transmission unit transmits the travelling route parameter generated by the parameter generation unit to the server.

According to such a configuration, depending on the road models such as a straight line, a curved line and a clothoid line, edge points required for expressing these road models, that is, the travelling road parameter including the minimum edge points required for a fitting, is transmitted to the server. Thus, according to the above-described configuration, for example, compared to a case where all edge points indicating the boundary of the travelling route are transmitted to the server, the communication quantity when uploading the data to the server from the vehicle can be significantly reduced.

It is considered that the data can be transmitted to the server after applying the fitting with a third order function or the like in order to cover all of a plurality of expected road models. However, in this case, it is wasteful when an object travelling route is a straight road. According to the above-described configuration, since the travelling route recognized by the travelling route reignition unit is classified into at least one of the road models, and the data is transmitted to the server with only the necessary edge points required for expressing the corresponding road model, the communication quantity for uploading the data to the server from the vehicle can be lowered. Therefore, according to the present embodiment, significant effects can be obtained in which the communication quantity is reduced in the communication between the vehicle and the server.

What is claimed is:

1. A vehicle apparatus configured to communicate with a server provided outside a vehicle comprising:
   a travelling route recognition unit that recognizes, based on an image captured by an imaging apparatus capturing an area in the vicinity of the vehicle, a travelling route where the vehicle travels;
   a classifying unit that classifies the travelling route recognized by the travelling route recognition unit into at least one of a predetermined plurality of road models;
   an edge point extracting unit that extracts edge points necessary for expressing a road model of the at least one of a predetermined plurality of road models classified by the classifying unit among edge points indicating a boundary of the travelling route recognized by the travelling route recognition unit;
   a parameter generation unit that correlates road model information indicating the road model classified by the classifying unit with the edge points extracted by the edge point extracting unit and generates a travelling route parameter indicating the travelling route recognized by the travelling route recognition unit; and
   a transmission unit that transmits the travelling route parameter generated by the parameter generation unit to the server, wherein
   the edge points necessary for expressing the road model comprise edge points located within a fitting error from an approximation curve of the at least one of a predetermined plurality of road models, and
   the edge points are recognized from the image captured by the imaging apparatus and indicate a boundary of the travelling route.

2. The vehicle apparatus according to claim 1, wherein
   the server is configured to generate map information in the vicinity of the vehicle based on the travelling route parameter transmitted from a plurality of vehicles and distribute the generated map information; and
   the vehicle apparatus further comprising:
   a non-volatile memory storing specific map information as the map information corresponding to specific locations;
   a receiving unit that receives information except for the specific map information among the map information distributed by the server; and
   a volatile memory that stores the map information received by the receiving unit.

3. The vehicle apparatus according to claim 1, wherein
   the transmission unit is configured to transmit the traveling route parameter at a transmission timing at which data indicating the travelling route parameter generated by the parameter generation unit is determined to reach a predetermined data quantity.

4. The vehicle apparatus according to claim 3, wherein
   the transmission unit determines at least one of a time when the number of landmarks that the vehicle passes reaches a predetermined determination number, a time when a travelling distance of the vehicle reaches a predetermined determination distance, and a time when a travelling time of the vehicle reaches a predetermined determination time to be the transmission timing.

5. The vehicle apparatus according to claim 1, wherein
   the transmission unit includes a data storing unit that stores data indicating the travelling route parameter generated by the parameter generation unit; and
   the transmission unit applies, when the data stored in the data storing unit reaches a predetermined allowable data quantity, priorities to respective stored data and executes a selection process of data based on the priorities.

6. The vehicle apparatus according to claim 5, wherein
   the transmission unit applies priorities to respective data stored in the data storing unit such that the older the last-updated date of data, the higher the priority is.

7. The vehicle apparatus according to claim 5, wherein
   the transmission unit applies priorities to respective data stored in the data storing unit based on an instruction of the server.

8. The vehicle apparatus according to claim 7, wherein
   the server is configured to generate map information in the vicinity of the vehicle based on the travelling route parameter transmitted from a plurality of vehicles and distribute the generated map information; and
   the server sets priorities of the respective data such that priorities of data for a portion in which no map information is present, among the respective data stored in the data storing unit, are higher than data for a portion in which the map information is present.

9. The vehicle apparatus according to claim 1, wherein
   the edge points for expressing the road model are extracted based on the classified road model.

10. The vehicle apparatus according to claim 1, wherein
    the travelling route parameter transmitted to the server includes the edge points located within the fitting error.

11. A method for a vehicle apparatus configured to communicate with a server provided outside the vehicle, comprising:
    recognizing, based on an image captured by an imaging apparatus (3) capturing an area in the vicinity of the vehicle, a travelling route where the vehicle travels;
    classifying the travelling route into at least one of a predetermined plurality of road models;
    extracting edge points necessary for expressing a road model of the at least one of a predetermined plurality of road models among edge points indicating a boundary of the travelling route;
    correlating road model information indicating the road model with the edge points extracted and generating a travelling route parameter indicating the travelling route; and
    transmitting the travelling route parameter to the server, wherein
    the edge points necessary for expressing the road model comprise edge points located within a fitting error from an approximation curve of the at least one of a predetermined plurality of road models, and
    the edge points are recognized from the image captured by the imaging apparatus and indicate a boundary of the travelling route.

12. A computer readable non-temporary recording media that stores a vehicle program causing a vehicle apparatus that communicates with a server provided outside the vehicle to execute:
    a travelling route recognition process that recognizes, based on an image captured by an imaging apparatus capturing an area in the vicinity of the vehicle, a travelling route where the vehicle travels;

a classifying process that classifies the travelling route recognized by the travelling route recognition process into at least one of a predetermined plurality of road models;

an edge point extracting process that extracts edge points necessary for expressing a road model of the at least one of a predetermined plurality of road models classified by the classifying process among edge points indicating a boundary of the travelling route recognized by the travelling route recognition process;

a parameter generation process that correlates road model information indicating the road model classified by the classifying process with the edge points extracted by the edge point extracting process and generates a travelling route parameter indicating the travelling route recognized by the travelling route recognition process; and a transmission process that transmits the travelling route parameter generated by the parameter generation process to the server, wherein the edge points necessary for expressing the road model comprise edge points located within a fitting error from an approximation curve of the at least one of a predetermined plurality of road models, and the edge points are recognized from the image captured by the imaging apparatus and indicate a boundary of the travelling route.

\* \* \* \* \*